Oct. 2, 1928.

G. A. HALFVERSON 1,685,997

ELECTROMAGNETIC BRAKE

Filed July 24, 1925

WITNESSES:

INVENTOR
Gustaf A. Halfverson
BY
ATTORNEY

Patented Oct. 2, 1928.

1,685,997

UNITED STATES PATENT OFFICE.

GUSTAF A. HALFVERSON, OF VERONA, PENNSYLVANIA, ASSIGNOR TO WESTINGHOUSE ELECTRIC & MANUFACTURING COMPANY, A CORPORATION OF PENNSYLVANIA.

ELECTROMAGNETIC BRAKE.

Application filed July 24, 1925. Serial No. 45,741.

My invention relates to brake apparatus and more particularly to electromagnetic brakes, such as are used with electric motors for the control of cranes, elevators and the like.

One object of my invention is to provide a brake that is simple in construction, positive in its operaton and readily adjustable.

Another object of my invention is to provide means for permitting removal of the brake wheel and motor armature without materially disturbing the brake assembly.

Other objects will appear from the following description and the appended claims.

When it becomes necessary to remove a motor armature from its bearings for repairs, it is very desirable that the brake mechanism shall be disturbed as little as possible, for obvious reasons.

In accordance with my invention, it is possible to hoist the motor armature and the attached brake wheel vertically and thereby save time and expense that would otherwise be entailed.

An important feature of my invention resides in the self-alining brake shoes and the means provided for insuring that the shoes shall properly release the brake wheel when the electromagnet is energized. I also provide convenient means for positioning the housing of the electromagnet, whereby adjustments and renewals thereof are readily made.

Figure 1:
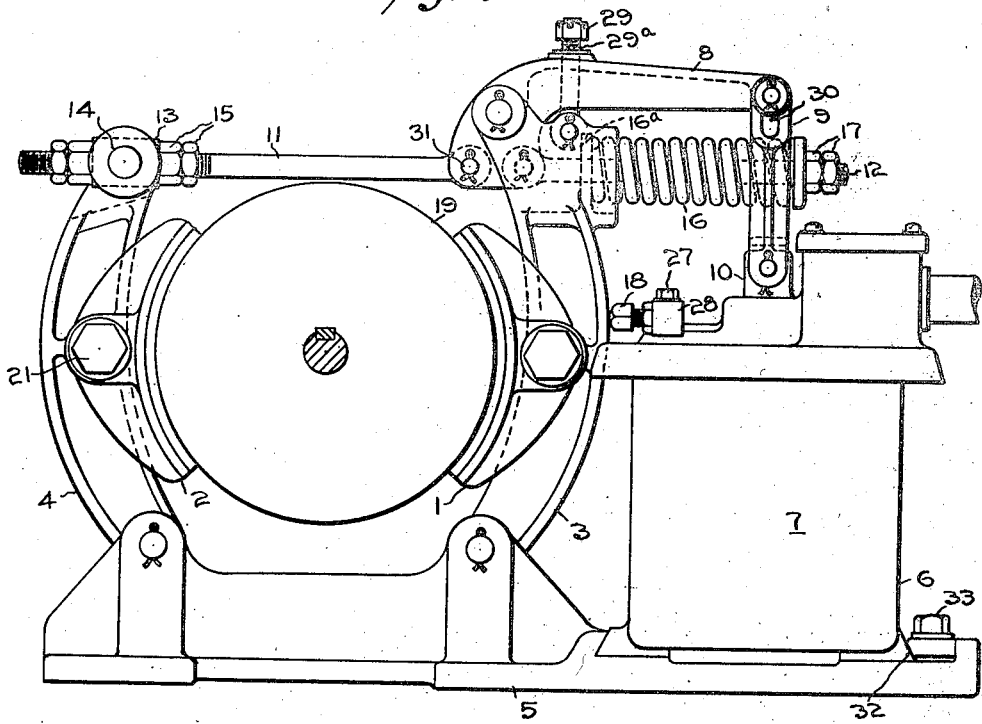
Figure 2:
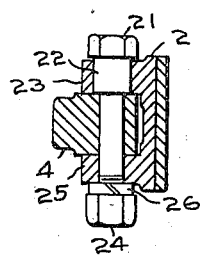
Figure 3:
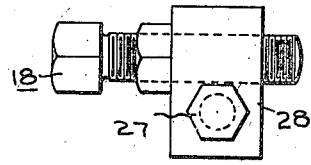

My invention will be best understood by reference to the accompanying drawing, in which Fig. 1 is a view in side elevation, illustrating the assembled apparatus, and Figs. 2 and 3 are views of certain details of the apparatus illustrated in Fig. 1.

With reference to the drawing, a pair of brake shoes 1 and 2 are pivotally mounted on brake arms or levers 3 and 4, respectively, which in turn are pivotally mounted on a base 5. The base also supports a housing 6 for the operating magnet 7, which may be of an oil immersed or any other suitable type. Suitable link or toggle mechanism is provided comprising a lever 8 that is pivotally mounted on one of the brake arms 3 and is connected by a link 9 to the vertical plunger 10 of the operating magnet 7. The lever 8 is pivotally attached to a pair of eye-bolts 11 and 12, which extend in opposite directions, and one of which is connected to the opposite brake arm 4 by means of a block 13 and bearing 14. Suitable adjusting and locking nuts 15 are provided, so that the distance between the brake arms 2 and 3 may be varied. The other eye-bolt 12 is supported by brake arm 3 and serves as a tension member to support the brake spring 16, the tension of which may be adjusted in a well-known manner by means of lock-nuts 17. The spring thus operates between the nuts 17 and a lug 16a on the brake arm 3.

The main operating lever 8 is normally actuated downwardly by the electromagnet 7 which, when energized, draws the right-hand brake arm 3 over against an adjustable stop 18 that is mounted on the magnet housing 6. From this position, further downward movement of the lever 8 actuates the left-hand brake arm 4 outwardly by means of the eye-bolt 11, and in this manner both shoes are released from the brake wheel 19.

The assembly of each shoe to the corresponding brake arm is illustrated in Fig. 2. The pivotal support for the shoe 2 comprises a bolt or bearing-shaft 21 having a shoulder 22 that is slightly longer than one arm or section 23 of the shoe casting. When the nut 24 is tightened, the shoulder 22 bears against the brake arm 4 on the one side and, on the other side, the arm and a portion 25 of the shoe are pressed together, a spring lock-washer 26 providing suitable tension.

This locking operation is performed after the brake has been assembled, as illustrated in Fig. 1, so that the shoes aline themselves with the brake wheel. The bearing bolts 21 are thus tightened so that, when the brake arms 3 and 4 are released from the wheel, the shoes do not tend to drag on the wheel but operate each as a unit with the corresponding brake arm.

This arrangement of the brake shoes is very convenient also when renewals are necessary, since there is but a single self-alining bearing. When it becomes necessary to remove the brake wheel and the motor armature, (not shown) stop 18 may be swung side-wise to clear the right-hand brake arm 3 by loosening the tap bolt 27 sufficiently to permit the block 28 and stop 18 to be lifted slightly and turned on this bolt. The main operating lever 8 may be moved downward by a locking nut 29, which co-operates with a bolt 29a that extends from brake arm 3 through lever 8, and this movement is continued beyond the normal travel of the magnet plunger 10 by reason of a slot 30 in the plunger link 9. Thus the brake spring 16 is compressed without disturbing the "setting" of the brake or the normal spring pressure, which is controlled by the adjusting nuts 17. Bearing pin 31 is then removed from the eye-bolt 11 and the eye-bolt is rotated in a counter-clockwise direction around its left-hand bearing 14 in the brake arm. Both brake shoes are now free from the wheel and when the wheel or armature is lifted vertically, the shoes may also turn slightly on their pivotal bearings 21.

The method of mounting the magnet housing 6 on the base 5 is such that the housing may be moved transversely and clamped in proper position by means of the bevelled clamp 32 and tap bolt 33. This assembly affords means for readily removing the magnet for repairs or renewals.

It will be obvious that a brake designed in accordance with my invention is convenient in its assembly and the various parts are readily accessible as may be required, particularly where the brake is mounted upon an overhead travelling crane. I have illustrated my invention in the preferred form but, of course, various modifications thereof will naturally occur to one skilled in the art and I desire that my invention shall be limited only by the scope of the appended claims.

I claim as my invention:—

1. In an electromagnetic brake, the combination with a pair of brake shoes and a brake wheel, of a link-mechanism for actuating the shoes, a spring for biasing said shoes against said wheel, an electromagnet for opposing said bias and manually operable means for further releasing said shoes to permit removal of said wheel either axially or transversely.

2. In an electromagnetic brake, the combination with a pair of brake shoes and a brake wheel, of a link-mechanism for actuating the shoes, a spring for biasing said shoes against said wheel, an electromagnet for opposing said bias, and manually operable means for further compressing said spring without disturbing the normal setting of the brake.

3. In an electromagnetic brake, the combination with a pair of brake shoes and a brake wheel, of a pair of arms for supporting said shoes, an operating lever mounted on one of said arms, a spring for biasing said lever, an electromagnet for opposing said bias, and a bolt mounted on said arm for locking said lever to said arm and to further bias said spring independently of said magnet.

In testimony whereof, I have hereunto subscribed my name this 21st day of July, 1925.

GUSTAF A. HALFVERSON.